United States Patent [19]

Nakayashiki et al.

[11] Patent Number: 4,984,233
[45] Date of Patent: Jan. 8, 1991

[54] METHOD AND APPARATUS FOR TESTING STATION ADDRESS IN NETWORK

[75] Inventors: Susumu Nakayashiki, Sagamihara; Jiro Kashio, Kawasaki; Hisashi Matsumura, Odawara; Hiroyuki Wada, Hadano; Yoshihito Sako, Hadano; Fumiaki Matsuura, Hadano; Ihei Kajiya, Hadano, all of Japan

[73] Assignees: Hitachi, Ltd., Tokyo; Hitachi Software Engineering Co., Ltd, Yokohama, both of Japan

[21] Appl. No.: 479,359

[22] Filed: Feb. 13, 1990

[30] Foreign Application Priority Data

Feb. 15, 1989 [JP] Japan .................................. 1-033622

[51] Int. Cl.$^5$ .............................................. H04J 3/14
[52] U.S. Cl. ....................................... 370/16; 370/94.1
[58] Field of Search ........................ 370/16, 94.1, 94.3, 370/85.12, 92; 340/825.05, 825.52

[56] References Cited

U.S. PATENT DOCUMENTS 4,689,786  8/1987  Sidhu et al. ............................. 370/92

OTHER PUBLICATIONS

"Token Ring Access Method and Physical Layer Specifications", IEEE Std. 802.5-1985, (ISO/dp 8802/5).
IEEE 802 Local Area Networks 802.5 (Token Ring Access Method) Recommended Practice for Dual Ring Operation with Wrapback Reconfiguration.

Primary Examiner—Douglas W. Olms
Assistant Examiner—Una Kim
Attorney, Agent, or Firm—Antonelli, Terry, Stout & Kraus

[57] ABSTRACT

A method for performing a duplicated address test used for a network including a first ring transmission line, a second ring transmission line having a signal transmission direction opposite to that of the first ring transmission line, and a plurality of stations connected to at least one of these ring transmission lines. Each of these stations has a flag DAC representing whether or not the duplicated address test is performed, and some of the plural stations constitute a plurality of control nodes having a configuration function of the network. The flag DAC of each of the stations is reset at a time instant when a power source of this station is turned on, and also when any of the control nodes receives the sent out configuration control frame. Each of the stations having the reset flags DAC sents out the duplicated address test frame to either the first or second transmission line to which the station is connected when a token frame to control a transmission right is captured. When another station having the same address as that of a source station receives the test frame, a discriminator indicative of an address duplication is added to this test frame.

11 Claims, 7 Drawing Sheets

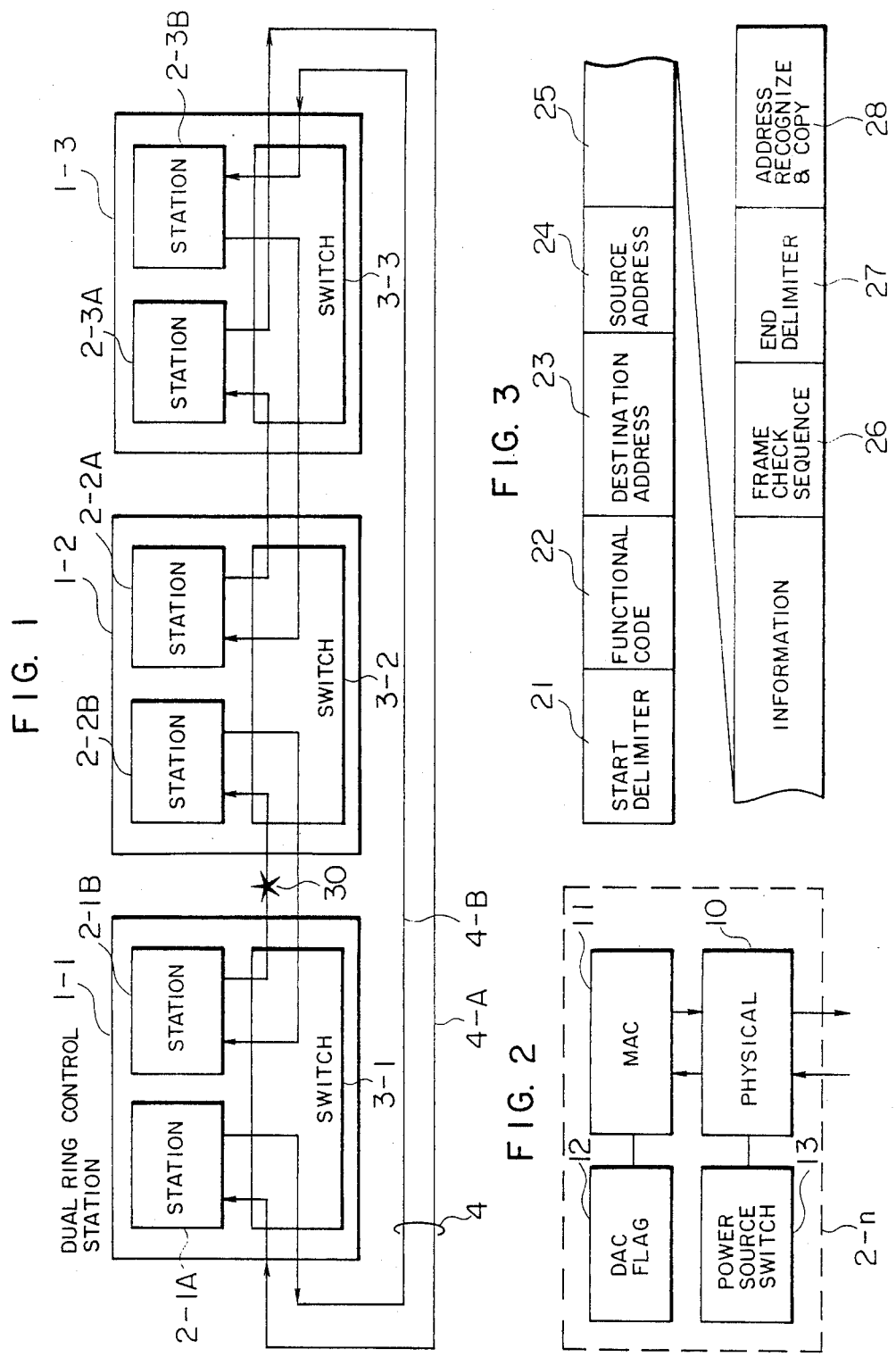

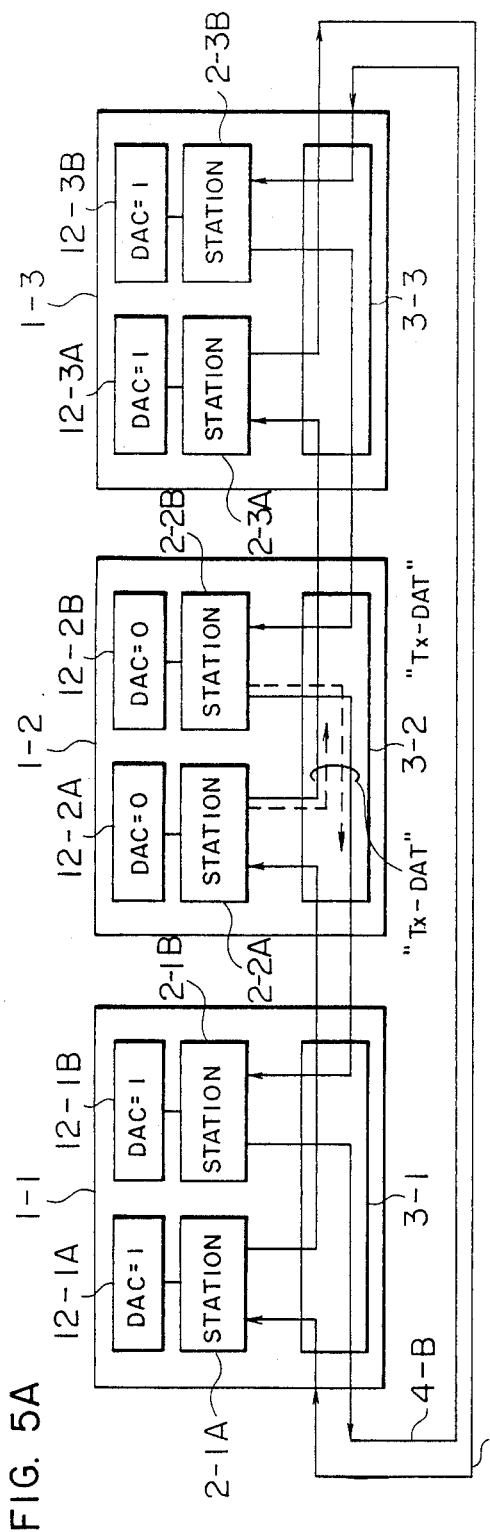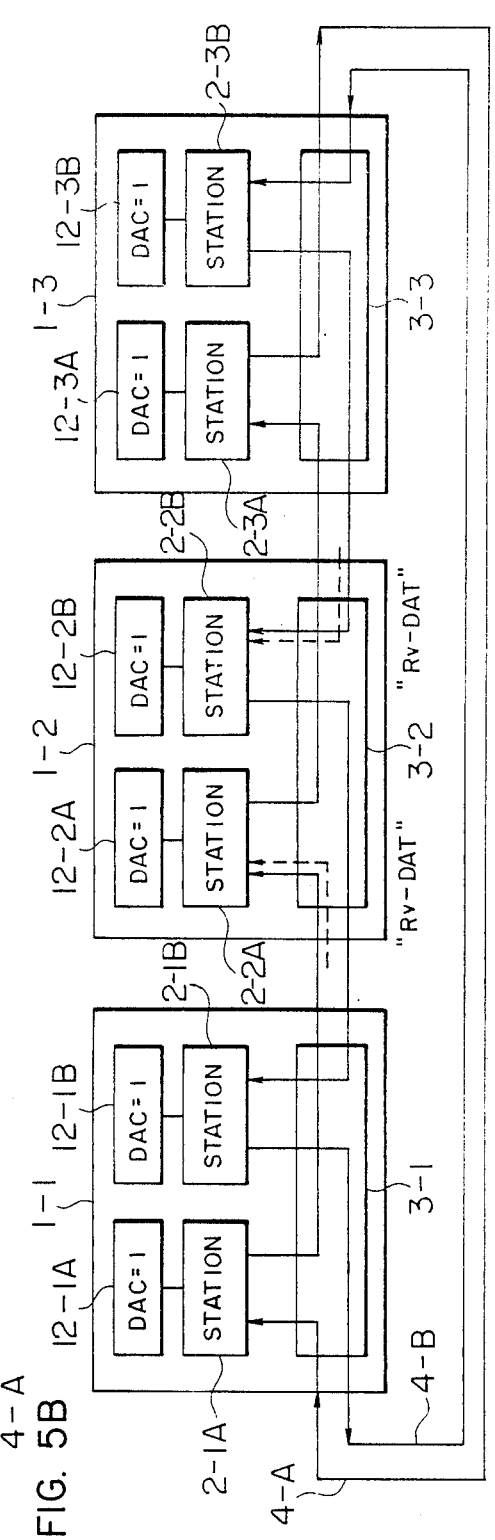

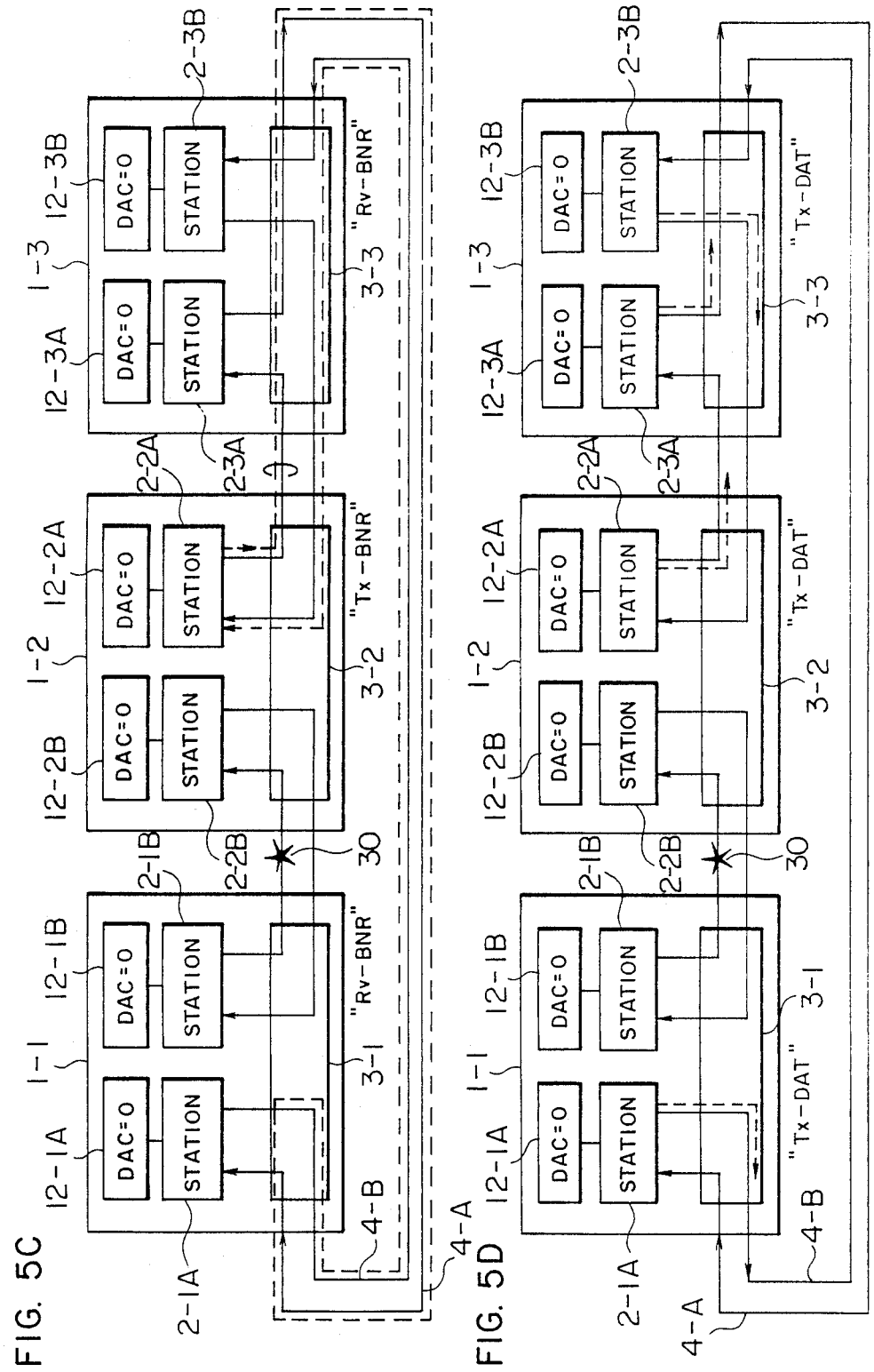

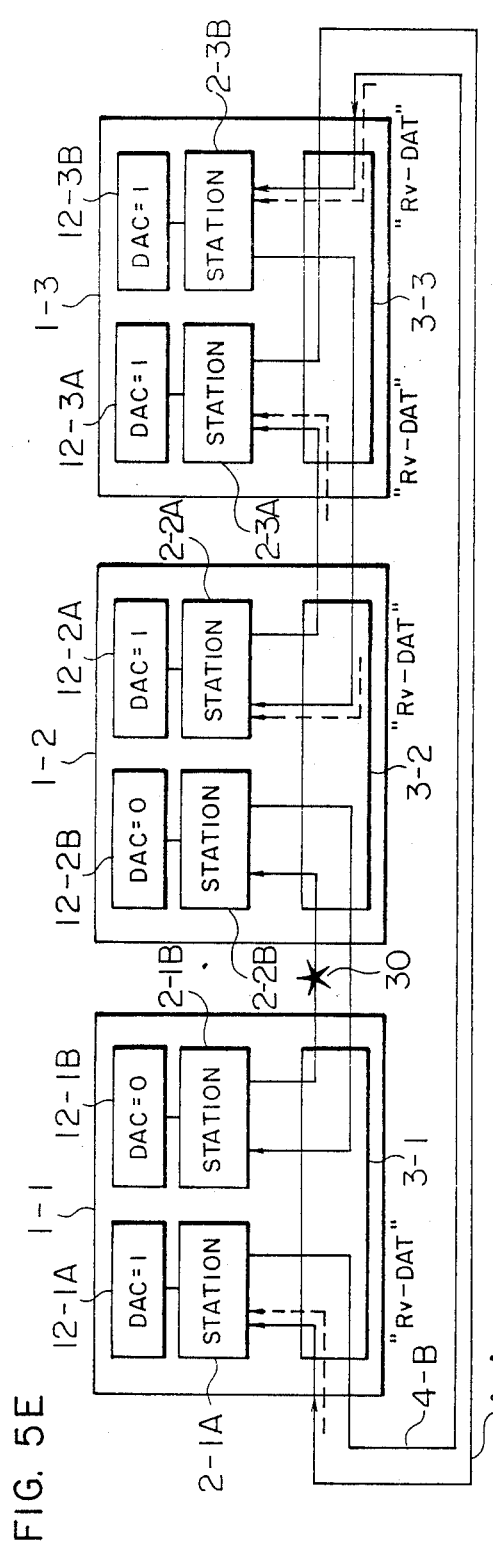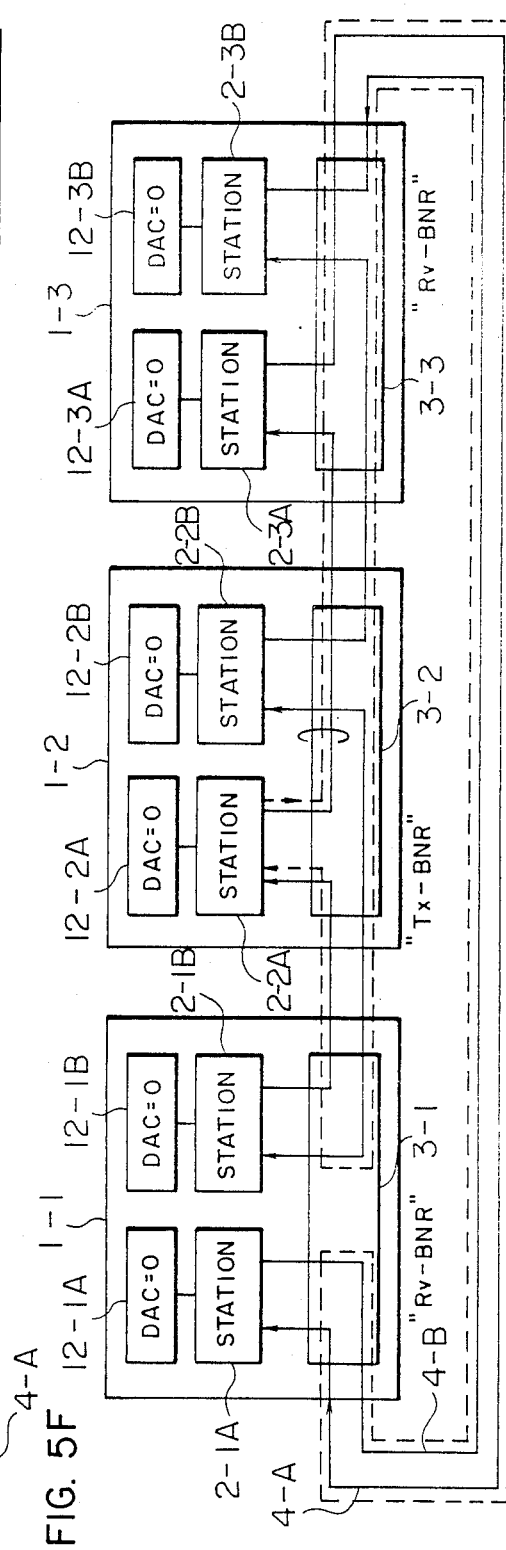
FIG. 5E
FIG. 5F

METHOD AND APPARATUS FOR TESTING STATION ADDRESS IN NETWORK

BACKGROUND OF THE INVENTION

The present invention relates to a communication network, and more specifically to a station address testing method for preventing that stations each having the same address are duplicated in a network including a plurality of networks.

In general, in case that stations (or nodes) each having the same address are duplicated in a network, a communication frame addressed to a specific station is received by the plural stations having the same addresses. This causes a problem that the communication frame may be received by the unexpected station. This problem may also occur in a so-called "Local Area Network (LAN)" in which a communication is performed via a common transmission path. Addresses of stations connected to the transmission path must not be duplicated with each other. In other words, in case that a communication is executed in a connection-less condition, the addresses of the respective stations must not be duplicated with each other within the communication network, but must be unique to each other.

There is described a conventional method for achieving the above-described conditions for a ring LAN in the following publication; "Token Ring Access Method and Physical Later Specifications" IEEE std. 802.5-1985 (ISO/DP 8802/5).

In accordance with the above-described publication, the following two operations are described as an operation of a station (new station) newly subscribed (connected) to ring LAN (simply referred to as a "ring").

(1) A new station subscribed to, first of all, the ring (under the condition that other stations are not connected to the ring in question) becomes an active monitor (AM) irrelevant to a duplication of addresses. The active monitor generates a token for controlling a data transmission right, and also supervise a normal circulation of the token on the ring.

(2) A new station subscribed to the ring after the second station (under the condition that AM is already present on this ring) performs a test (duplicated address test) whether or not a station having the same address already exists on this ring before it commences the stationary communication. This test is performed in such a way that a duplicated address test (DAT) frame where an address of a self-station has been set to a destination address is transmitted to the transmission path in accordance with the transmission control by the above-described token, and circulated around the ring. If there is another station having the same address as that of the self-station within this ring, when DAT frame is received by the above-described another station, a discriminator indicative of this fact is added and returned by the station in question. In the above-described publication, this discriminator is reflected by an address recognized display bit (AR bit). As a result, the newly subscribed station can recognize whether or not the duplicated address occurs within the ring in question by checking the discriminator in the circulated frame.

In case that the addresses are duplicated with each other, for instance, the self-station is bypassed (under the condition that the self-station is separated from the ring), so that prevention is achieved in such a manner that a plurality of stations each having the same address exist within the same ring. This duplicated address test is carried out as a part of a procedure under an initial (initializing) condition of the self-station in question.

However, in the above-described prior art, there is no sufficient care to be taken for the following three items. As a consequence, a problem exists in that a plurality of stations (duplicated address stations) having the same addresses are still present within the same ring.

(a) Under the first condition, namely under the condition where no active monitor is present in the ring in question at all, in case that a plurality of stations having the same addresses are substantially simultaneously subscribed (connected) to the same ring, these stations compete with each other in order to establish an active monitor. However, since none of these stations performs the duplicated address test, there exist the duplicated address stations in the ring in question in this case.

(b) In a network where a plurality of stations are connected by a double ring constructed of a first ring and a second ring, the signal transmission direction of which is different from that of the first ring, when, for instance, a fault occurs, in case that a new closed ring is formed (a ring reduction) on both sides of a fault occurring point by a ring fold (loop back), the duplicated address stations may exist within this closed ring. This is because each of the stations connected to either the first ring, or the second ring performs the duplicated address test for the ring (e.g., first ring) to which the self-station is connected, but does not execute the duplicated address test between the self-station and another station connected to the other ring (for example, second ring). In the ring fold, the new closed ring detouring around the fault occurring point is formed by integrally forming the first and second rings. Therefore, although the duplicated address test is required between these rings, such a test is not performed in the above-described conventional method.

(c) In case that a single larger closed ring is formed (ring expansion) by coupling a plurality of independent rings, for instance, in the above-described double ring, a similar problem to the above case may be provided when a plurality of rings which have been separated due to the fault are recombined by repairing the fault occurring point. That is to say, since no duplicated address test is carried out between the rings, the duplicated address stations are present in case that a plurality of rings are combined to form a single ring.

The above-described problem (a) corresponds to a drawback of the prior art described in the above-mentioned publication, whereas the remaining problems (b) and (c) correspond to problem occurring in such a case that a new function is realized based upon the above prior art.

SUMMARY OF THE INVENTION

An object of the present invention is to provide a duplicated address test method for confirming whether or not there are a plurality of stations having the same addresses within a single ring.

Another object of the present invention is to provide a duplicated address test method capable of preventing the existence of a plurality of stations with the same addresses on the same ring by reducing the ring, or expanding the ring even when a quantity of stations connected to a single ring is varied.

A further object of the present invention is to provide a network system capable of preventing the existence of more than two stations with the mutually duplicated address.

A still further object of the present invention is to provide a communication system in which each of stations can participate in the above-described network system after a confirmation is made that no other stations having the same addresses exist on the same ring.

To achieve the above-described objects, according to the present invention, a means for discriminating whether or not a duplicated address test for all of stations on a network has been completed in a normal condition is employed, and the station for which the above-described duplicated address test has not yet been accomplished, commences a stationary communication after this test is ended in a normal condition. It should be noted that the above-described duplicated address test may be exceptionally omitted as to a single station which has been determined as an active monitor. This is because participation of a station having the same address as that of the active monitor can be avoided if the duplicated address test is performed for all of the stations other than the active monitor.

The means for discriminating whether or not the duplicated address test has been completed may be realized by, for instance, giving a duplicated address check flag (DAC) to the respective stations as a communication protocol specification of a single ring. Then, for example, when DAC=0, the duplicated address test has not yet been completed, whereas when DAC=1, this test has been ended. As previously described, each of the stations sends DAT in accordance with a token control in case of "DAC=0", so as to carry out the duplicated address test. When DAT has been ended in the normal condition, namely no duplicated address exists, "DAC=1" condition is established and a mode capable of performing the stationary communication is set. On the other hand, when DAT has been completed in the abnormal condition, that is to say, duplicated addresses are present, a self-station is bypassed from the ring in question. In summary, only stations for which the duplication address test has been ended in the normal condition are brought into such a condition of "DAC=1", and the ring is constructed of only these stations. As a result, such a problem that a plurality of stations with the same addresses exist in the single ring can be solved.

In a network of a double ring, according to the present invention, when a ring loop back is performed in a part of the network, each of stations contained in a newly formed close ring surely performs a duplicated address test. In other words, when the ring loop back is executed, all of the stations are once set to such a condition that the duplicated address test is not yet completed, after the new close ring is formed the duplicated address test is newly performed and thereafter the stationary communication is commenced. Also in this caes, the duplicated address test may be omitted with respect to the station which has been determined as the active monitor in the newly formed close ring. Similarly, in accordance with the present invention, also in case of an ring expansion, all of tthe stations contained in the expanded ring are set to such a condition that the duplicated address test is not yet accomplished. As a consequence, each of the stations connected to the newly formed close ring performs the duplicated address test newly in accordance with the above-described corrected single ring protocol, and starts the stationary communication.

Here, considering that a ring is reduced, or expanded in a network having a double ring arrangement, since a duplicated address test is newly required when an arrangement of the ring is modified due to the ring reduction or expansion, such a change that each of the stations is brough into a condition of "DAC=0" at this time may be obtained. As this chance, for instance, if a specific frame flow every time the arrangement of the ring is varied, the value of DAC can be controlled by utilizing this frame. The above-described specific frame may be equal to an abnormal announcing frame ("Beacon" described in the above-mentioned publication) for announcing an occurrence of an abnormal condition in a ring, otherwise may correspond to a frame for controlling an arrangement so as to reduce, or expand a ring. Furthermore, this specific frame may be equal to a frame exclusively employed in order to control a value of DAC. In these cases, the respective stations are brought into such a condition of "DAC=0" every time the above-described specific frame is received, thereafter the duplicated address test is carried out and these stations are controlled in such a mode that the stationary communication can be established.

In accordance with the present invention, even when the new close ring is formed due to the ring reduction, or ring expansion, there is no such a problem that the stations having the duplicated addresses exist in this close ring.

The foregoing and other objects, advantages, manner of operation and novel features of the present invention will be understood from the following detailed description when read in connection with the accompanying drawings.

BRIEF DESCRIPTION OF THE DRAWINGS

FIG. 1 is a schematic block diagram of an overall arrangement of a double ring network to which the present invention is applied;

FIG. 2 is a schematic block diagram for representing a major constructive element of a station;

FIG. 3 is a diagram representing a format of a duplicated address test frame;

FIGS. 5A to 5H are illustrations for explaining procedures of the duplicated address test according to the present invention in accordance with conditions of networks; and, FIG. 6 is a diagram for representing the duplicated address test according to the invention, on a condition transition diagram of each station.

DESCRIPTION OF THE PREFERRED EMBODIMENTS

Figure 4A:
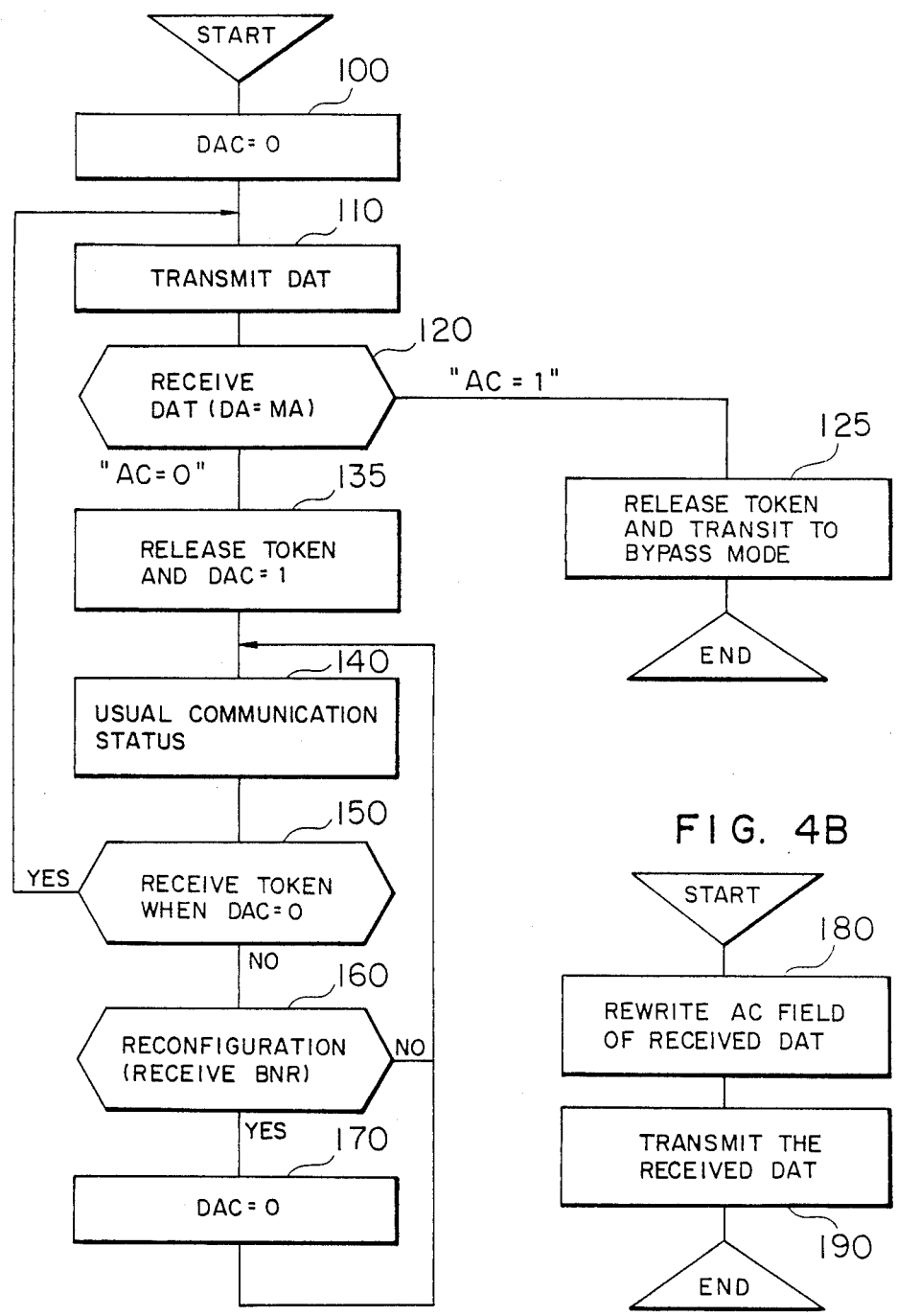
FIG. 4A is a flowchart of a control operation effected by the respective stains so as to realize a duplicated address test according to the present invention.

In FIG. 1, there is shown an example of a network to which the present invention is applied. This network is so constructed that a plurality of double ring control stations or nodes (simply referred to as a "control station hereinafter") 1-1 to 1-3 are mutually connected with each other by a double ring 4 arranged by first and second ring-shaped transmission paths 4A and 4B having signal transmission directions opposite to each other.

Each of these control stations 1-n is constructed of a pair of single-ring stations (simply referred to as a "station" hereinafter) 2-nA, 2n-B, and a transmission path changing switch 3-n. The double ring network may be understood as such a condition that a single ring network is doubled. During the normal condition, the switch 3-n is operation in such a manner that a primary station 2-nA is connected to the first transmission path 4A, and a secondary station is connected to the second transmission side. It should be noted that a station for constituting a control station and another station not for constituting a control station are mixed in the respective rings.

In the double ring network system, when for instance, a fault occurs on a portion of the first transmission path, a first loop back path from the first transmission path 4A to the second transmission path 4B is formed in the control station adjacent to an upper stream side of this fault, whereas a second loop back path from the second transmission path 4B to the first transmission path 4A is formed in the control station adjoining a lower stream side of this fault. As a result, a single close ring constructed of the first transmission path and second transmission path is reconstructed, whereby a communication function is recovered.

FIG. 1 represents such a condition that a fault 30 occurs on the first transmission path between the control stations 1-1 and 1-2, and a close ring formed by successively connecting the stations 2-1A, 2-3B, 2-2B and 2-3A with each other is reconstructed. In the control stations 1-1 and 1-2 positioned adjoining the fault, the switch is so operated that the primary stations 2-1A and 2-2A are connected to the side of the close ring in which the communication function is recovered, and the secondary stations 2-1B and 2-2B are connected to the transmission path positioned at the side of the fault 30.

It should be noted that although there is shown such a construction in the above-described example, that each of the control stations includes two terminals 2-nA and 2-nB, the respective control stations may include an internal transmission path containing a plurality of port switches, and a line concentrator in which the stations (terminal units) can be further connected to these port switches may be applied thereto, as described in, for instance, a pending U.S. patent application Ser. No. 046,031 entitled "Ring Network System and Configuration Control Method" filed by the same Inventors, and now allowed.

FIG. 2 represents aninternal arrangement of a station 2-n. Reference numeral 10 indicates a physical layer communication mechanism (PHY), numeral 11 denotes a medium access control layer communication mechanism (MAC) realized by executing a program of a microprocessor. These functions are also described in the above-described publication. It should be noted that although the actual station 2-n is equipped with mechanisms other than these two mechanisms, other elements and communication functions having no direct relationship with the present invention are omitted from the drawing.

In accordance with the present invention, MAC11 includes a memory 12 for storing a duplicated address chech flag (DAC), and perform an address test operation in response to conditions of this DAC flag (will be discussed later).

An address test routine is initialized in response to such a condition that a station is changed from a rest state to an active state by turning on a power switch 13.

FIG. 3 represents a configuration of a frame 20 employed by MAC11 of the station 2 for a communication purpose. Reference numeral 21 is a start delimiter (SD), numeral 22 indicates a functional code (FC), numeral 23 represents a destination address (DA), numeral 24 denotes a source address (SA), numeral 25 is information (INFO), numeral 26 indicates a frame check sequence (FCS), numeral 27 represents an end delimiter (ED), and numeral 28 indicates a field used for an address recognize and copy indicator (AC).

A specification of the AC field 28 may be formed, for instance, as follows. If AC in which a source station sends a frame of AC="0" and a station which receives this frame (namely, the DA field 23 is coincident with an address of a self-station) is contained in the reception frame, is rewritten by "1", the source station can recognize whether or not this frame has been received by a destination station by checking the AC field 28 contianed the reception frame.

In FIG. 4A, there is shown a program flowchart for representing operations of the station in which the present invention has been embodied. This program routine is initialized by, for instance, turning on a power supply of a station to be connected to a ring. First, the duplicated address check flag (DAC) 12 is set to DAC="0" (step 100), and when a token is captured, a duplicated address test frame (DAT) is sent out to the transmission path, or line (step 110). The DAT frame coresponds to such a frame that an address (previously allocated to a self station (my (this station's) address: MA) is set to the DA field 23 of the MAC frame 20, and a set is made of AC field 28="0". In the FC field 22, a discriminator representing that this frame corresponds to DAT is contained, by which this FC field 22 may be discriminated from a frame employed for other functions. This discriminator may be contained in the INF10 field 25, instead of the FC fields 22.

Subsequently, a reception of the sent DAT frame is continuously monitored, if the DAT frame of AC−"1" is received at DA=MA (step 120), the self-station is bypassed from the ring transmission path (line) by way of the switch 3-n after the token is released (step 125). In case that any one of the single ring stations 2-nA and 2-nB is brought into the bypass condition within the double ring control station 1-n, this double ring control station loses a configuration control function of the double ring. On the other hand, in case that the DAT frame of AC="0" is received at DA=MA, after the token is released and the DAC flag 12 is set to "1" (step 135), the process is advanced to the stationary (usual) communication condition (step 140). Under this usual communication condition, the station 2 sends and receives the communication frame in accordance with, for instance, the token control procedure. In case that the above-described DAT frame sent out at the step 110 cannot be received within a predetermined time period, a permanent waiting condition of the DAT frame can be escaped by, for example, a timer interruption. In FIG. 4A, this control has been omitted therefrom.

Under the usual communication status 140, the station repeats the following operation. In case that the token is received when the DAC flag 12 is a "0" status (step 150), the process is returned to an initialization condition and the duplicated address test is again performed. DAC="0" implies that requirements of the duplicated address test are made due to some reasons under the stationary (usual) communication condition. It should be noted that although the duplicated address test was performed when the token was received in the above-described preferred embodiment, this test may be executed when any other status than the token, which indicates that the ring is in the normal condition is detected. For instance, the purge MAC frame, or the active monitor present (AMP) MAC frame as described in the above-described publication may be utilized so as to perform the duplicated address test.

When a fault occurs in a portion of the newtwork during the usual communication condition, and the control operation of the ring reconfiguration is performed (step 160), the DAC flag 12 is set to "0" (step 170). As a result, when the token is received subsequently, the duplicated address test is again executed. As the method for recognizing whether or not the configuration control is performed in the network, the frame as described in the following publication may be utilized: IEEE 802 Local Area Networks, 802.5 (Token Ring), "Recommended Practice for Dual Ring Operation with Wrapback Reconfiguration", 802.5c/D15, Sept. 9, 1988.

According to the above-described publication, when the configuration control, namely the loop back of the transmission path is performed in the double (duplicated) ring network, the beacon reconfiguration (BNR) is sent out. Each of the stations can reconginze the execution of the configuration control by resetting the DAC flag 12. It should be noted that the ring expansion is executed as the configuration control, BNR may not flow on the ring in accordance with the above-described publication. To solve the duplicated address problem by the same control during the ring expansion and ring reduction, BNR may flow on the ring even in the ring expansion. In other words, while the loop back of the transmission path adjacent to the recovered fault point is released, the station of the double ring to expand the ring may send out BNR. It should be noted that both of the two ring stations 2-nA and 2-nB are not required to send out BNR within this double ring control station, but only one of these ring stations may send out BNR. In short, the DAC flags 12 of all of the single ring stations contained in the newly formed ring may be reset (i.e., set to "0").

In the operation flow represented in FIG. 4A, roughly speaking, the operations defined up to the step 135 correspond to the initial condition (initialization state), and the operations defined after the step 140 correspond to the usual (stationary) operation condition. The usual oepration condition corresponds to a condition of a station where the duplicated address test has been completed in the normal condition. In accordance with the present invention, when there is a necessity of the duplicated address test by performing the configuration control, either the respective configuration control stations, or ring stations again move from the usual operation condition into the initial condition.

Figure 4B:
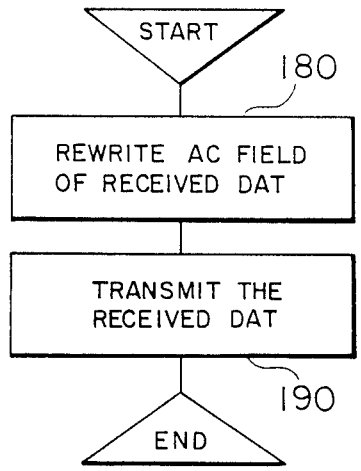
FIG. 4B is a flowchart for representing operations of the respective stations performed upon receipt of a duplicated address test frame sent by the other stations.

FIG. 4B is a flowchart for representing operations of stations when receiving a DAT frame in which a destination address sent out by another station is identical to an address of a self-station.

In case that a DAT frame for designating a self-station is received though the self-station has not yet sent out a DAT frame, an AC field 28 contained in the received DAT frame is rewritten by "1" (step 180). Then, the DAT frame in question is sent out to the transmission path (step 190). Upon receipt of the above-described DAT frame by a source station, as previously stated, the source station perform the bypass operation as defined at the step 125 shown in FIG. 4A.

FIGS. 5A through 5H illustrate networks constituted by double (duplicated) rings on which the procedures of the duplicated address test previous described are represented.

FIG. 5A: stations 2-2A and 2-2B of DAC="0" present in a newly initialized control station 1-2 send out DAT frames indicated by dot lines, respectively (TX-DAT) so as to perform the duplicated address test.

FIG. 5B: while receiving a DAT frame of DA=MA and also AC="0", (Rv-DAT(DA=MA, AC= )), the above-described two stations 2-2A and 2-2B accomplish the duplicated address test in the normal condition, and the DAC flag 12 is set to "1".

FIG. 5C: there is shown such a condition that the fault 30 occurs in the first transmission path 4A between the control stations 1-1 and 1-2, and these control stations have formed the loop back path so as to detour around the fault 30.

Once an abnormal condition occurs in a network, a station for detecting such an abnormal condition sends out a BNR frame into the network. If the above-described abnormal condition is caused by, for instance, a physical trouble on the transmission path, a station (the station 2-2A shown in FIG. 5C with respect to the fault 30) positioned immediately at the lower stream of this fault, detects the fault at first. Upon receipt of the BNR frame from the upper stream, each of the stations relays this frame to the lower stream side and resets the DAC flag to "0". At this time, if a self-station are transmitting the BNR frame, he stops the transmitting operation of this BNR frame. As a result, only the station 2-2A present in the control station 1-2 which is located most near the fault point at the lower stream side thereof, continues to send out the BNR frame (TX-BNR), which becomes an active monitor.

It should be noted that the formation of the first and second loop back paths for detouring around the fault point may be realized by employing the control procedure which has been proposed in, for instance, a pending U.S. patent application Ser. No. 171,698 entitled "Data Communication and Network System and Reconfiguration Control Method" filed by the same Inventors, and now allowed.

FIG. 5D: when a new close ring (active ring) constructed of first and second transmission paths is formed by the above-described network reconfiguration control operation, so that the communication function of the network is recovered, each of the stations in which the DAC flag has been reset sends out a DAT frame for carrying out the duplicated address test (TX-DAT). The transmission operations of the DAT frames are sequentially executed in such a form that the station 2-2A which has become the active monitor firstly sends out the DAT frame, and releases the token when the duplicated address test is completed, and further the station 2-3A which has received this token commences the address test. It should be noted that as previously described, the station 2-2A which already became the active monitor may omit the above-described duplicated address test (defined from the steps 110 through 170), and may immediately send out the token.

FIG. 5E: Each of the stations which have sent out the DAT frames contains an address of a self-station in a DA field. When an AC field receives a DAT frame of "0", a duplicated address test has been ended in a normal condition so that a DAC flag is set to "1" and the respective stations are returned to the normal communication condition. As a consequence, each of the stations other than the active montior is successively brought into a standby monitor condition.

FIG. 5F: there is shown one condition in ring expansion stages performed so as to combine two independent close rings after the fault 30 has recovered. When a local ring containing the fault 30 becomes such a condition, as represented in FIG. 5C, that this ring is separated from the active ring, the respective stations included in this local ring and being in a wrapback state each sends out a normal beacon frame (BNN) which is distinct from the BNR. When BNN transmitted from other station is received, these stations contained in the local ring relay this BNN and stop to send out another BNN from the self-station. In the preferred embodiment shown in FIG. 5C, the station 2-1B stops to transmit BNN whereas only the station 2-2B continues to send out the beacon frame. When the fault 30 is recovered, since BNN is circulated in the local ring and returned to the source station 2-2B, this station 2-2B can detect that the fault occurring in the above-described local ring has been recovered.

At this time, the station 2-2B sends out the token to the above-described local ring so as to check whether or not this sent token can be circulated around the local ring. The station 2-1B can detect recovery of the fault 30 by receiving the above-described token.

When the station 2-2B confirms that the local ring becomes the active ring by receiving the token the switch 3-2 is operated in such a manner that two active rings in the control station 1-2 are combined with each other and are brought into the conditions shown FIG. 5F. Then, either the station 2-2A, or station 2-2B becomes the active monitor whereby the BNR frame is sent out (TX-BNR).

The above BNR frame is circulated around the combined active ring, and the DAC flags of the respective stations which have received this BNR frame are set to "0" respectively. The respective stations in which the DAC flags have been reset sequentially send out the DAT frames, similar to the explanations in FIGS. 5D to 5E, and are returned to the usual communication condition after the duplicated address test has been completed in the normal condition.

Figure 5G:
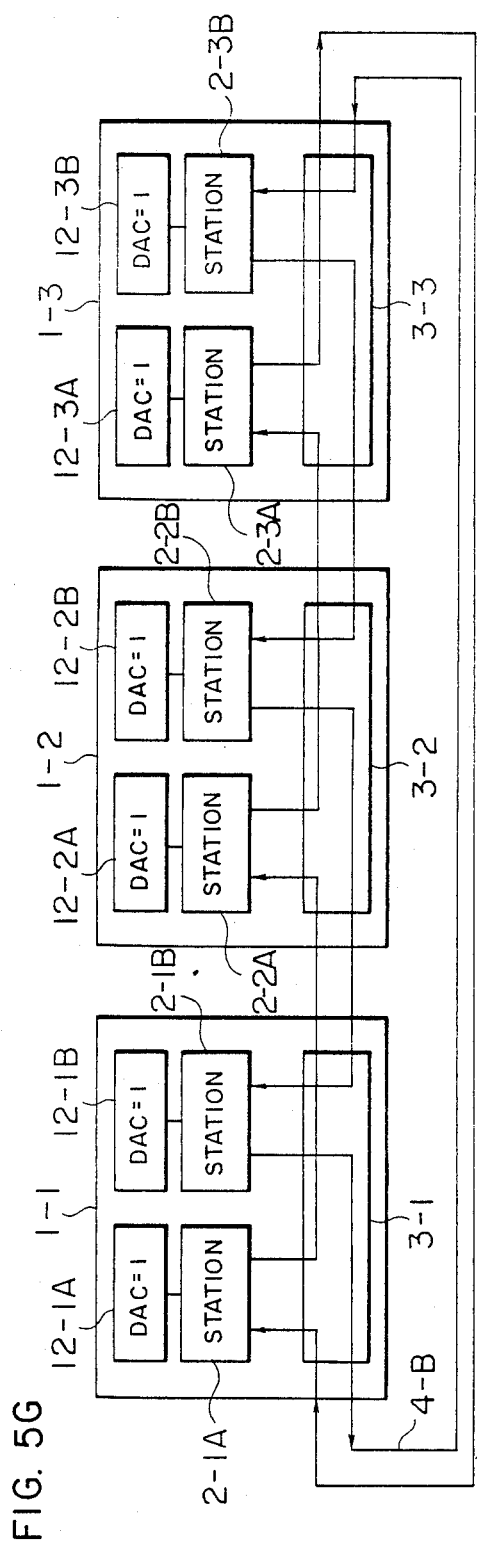

FIG. 5G: The above-described combination operation of the active rings is also performed in the control station 1-1. If none of these addresses are duplicated, as represented in FIG. 5G, a double (duplicated) ring network is finally reconfigured which contains only the primary stations 2-1A to 2-3A that have completed the duplicated address test (DAC-"1") on the first transmission path (line) 4A, and further contains only the secondary stations 2-1B to 2-3B that have accomplished the duplicated address test on the second transmission line (path) 4B.

Figure 5H:
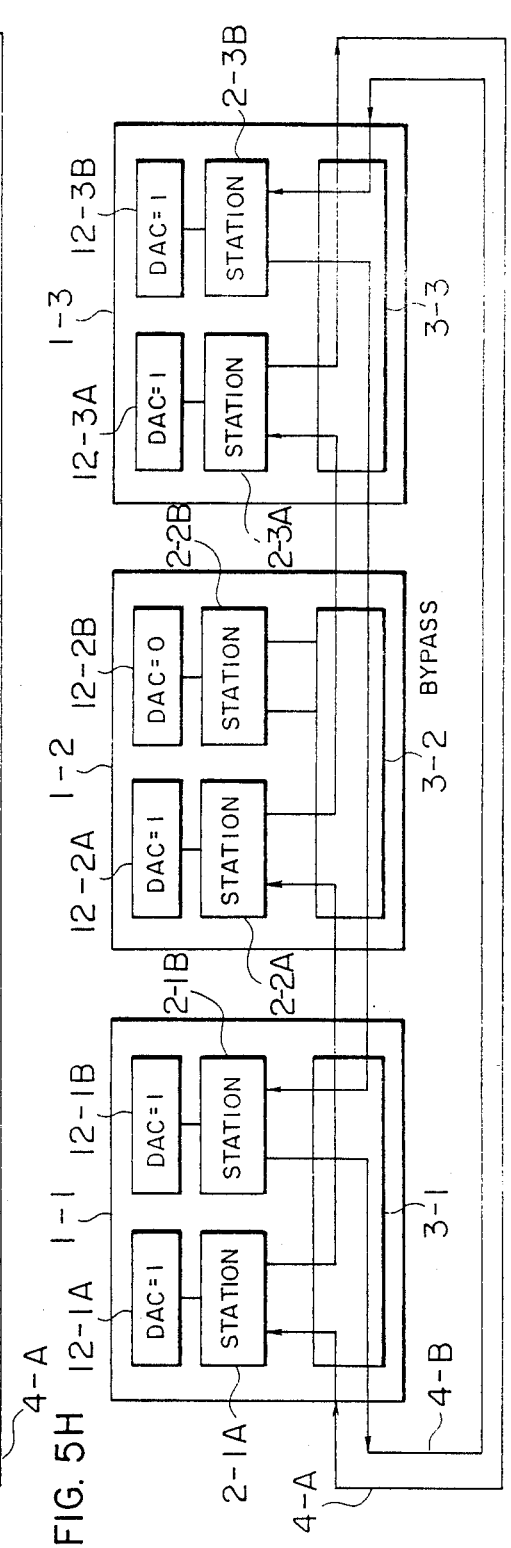

FIG. 5H: There is shown such a condition that both any one of other stations and a single station 2-2B having the duplicated address are bypassed from the ring transmission line.

Figure 6:
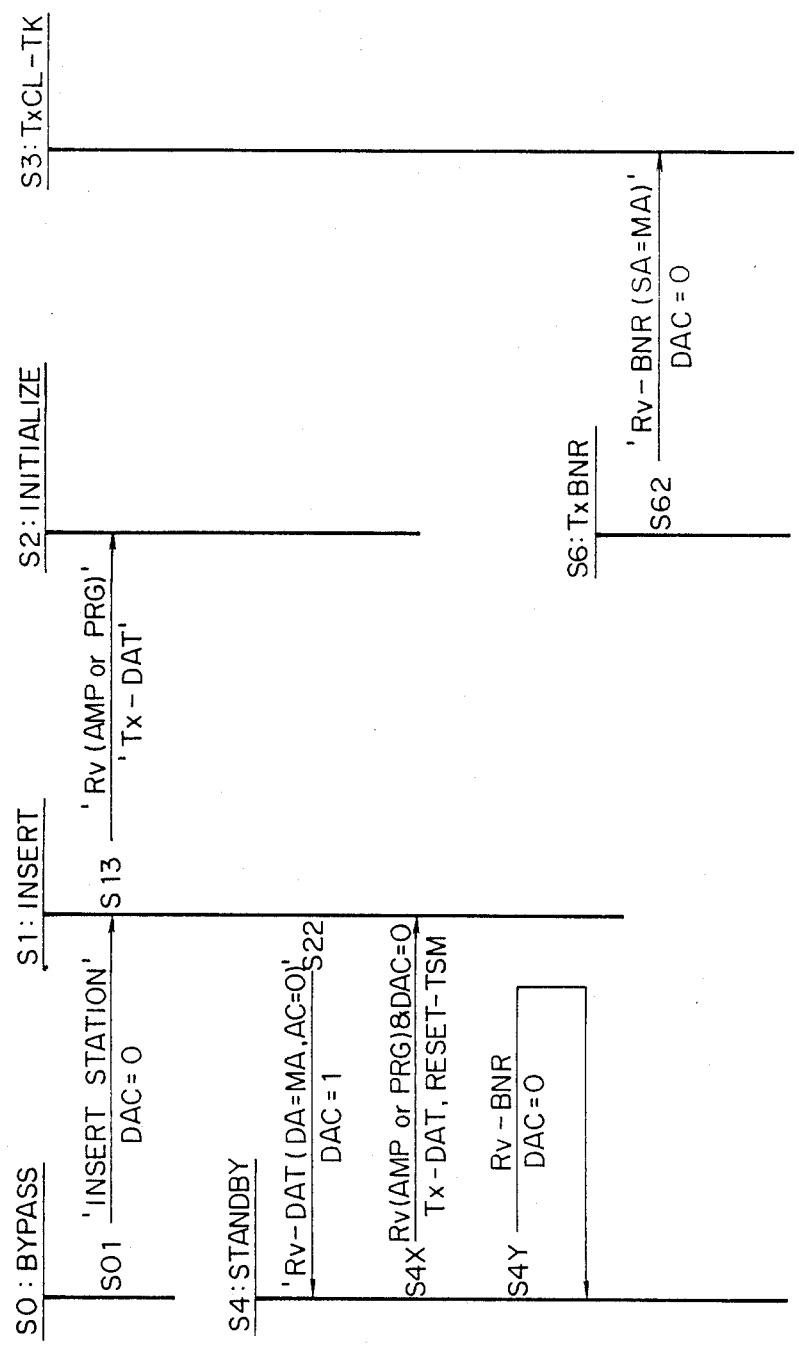

FIG. 6 represents an improved duplicated address testing method in which the conventional method described in the above-described publication as prior art is employed and an additional correction has been effected so as to apply the present invention to the conventional method. In this figure, a statement indicated by "xxxx" represents the conventional technique. The problem by the single ring protocol in prior art can be solved by S01, S22, and S4X according to the present invention, whereas the problem by the ring reduction can be solved by further adding S4Y and S62. As to the ring expansion, the above-described problem can be solved by, for example, forcibly bringing only one single ring station (at the MAC1 side in accordance with the above-described publication) within the double ring control station into the S6 condition (BNR transmission: Tx-BNR). This movement of the single ring station provides a particular advantage for such a fact that the active monitors are combined to establish a single active monitor. Since the stations which already became the active monitors releases the active monitor rights upon receipt of BNR transmitted from other stations, only one active monitor can be quickly determined. In case that a plurality of double ring stations simultaneously release the ring loop back in order to expand the ring, BNRs are sent out from the plural stations (i.e., single ring stations). In accordance with the control as described in the above-described publication, only one station for continuously transmitting BNR can be specified under the competition control of BNR. However, since the stations under the transmission condition of BNR compete with each other for the receptions of BNRs which have been sent out from other stations, there are some cases that no station for continuously transmitting BNR exists on the ring. Even in such a case, there is no problem according to the present invention since the active monitor invention since the active monitor can be finally established. Moreover, even when both the duplicated address test and preventing function are added so as to embody the present invention, no limitation is given to the conventional functions. In addition, the problem on the duplicated address can be solved according to the present invention, while maintaining the equal distribution between the respective double ring control stations, or respective single ring stations.

In the above-described preferred embodiments, the communication was performed in such a mode that each of the stations which had sent out the communication frame such as the DAT frame released the token after this communication frame was circulated. However, the duplicated address test method according to the present invention may be applied to the early token release method of ring network in which each of the stations releases the token immediately after the communication frame has been sent out, whereby a plurality of stations can successively send out the data.

In this case, possibilities may exist in that both of the first and second stations are brought into the bypass condition under the following conditions. That is to say, if the second station having the same address as that of the first station sends out another DAT frame before the DAT frame sent out from the first station is circulated in the ring and returned thereto, these two stations mutually may rewrite the AC fields of the corresponding DAT frames into "1".

To bring only one station of two stations having the same addresses with each other into the bypass condition in the early token release type ring network, a transmission control of a DTA frame may be executed in such a way that after the DAT frame sent out by the above-described first station has been circulated in the ring, the other station sends out the succeeding DAT frame on the transmission path.

To achieve the above-described DAT frame transmission control, for instance, the active monitor may send out such a control frame that a single group address by which all of the stations having the DAC flags of "0" are to be received is contained in the DA field 23, a code indicating that this frame corresponds to a DATS (Duplicated Address Test Start) frame for controlling the transmission of the DAT frame, and "0" is contained in the AC field 28, and also when the respective stations receive the DATS frame of "AC=0", the station may capture the transmission right of the DAT frame. Upon receipt of the above-described DATS frame, the first station under such a condition that the DAC flag most near the active monitor becomes "0" rewrites the AC field in this DATS frame into "1", and sends out the DAT frame at a time instant where the token is received. The DATS frame of "AC=1" is circulated in the ring and erased by the active monitor functioning as the source sender. If there exists the second station having the same address as that of the first station while the DAT frame sent out from the first station is circulated in the ring, this frame having such a form that the AC field has been rewritten by the second station into "1" is returned to the first station functioning as the source sender. When the DAT frame is returned, the first station sends a new DATS frame of "AC=0", and erases the DATS frame which has been circulated around the ring if AC of the received DAT frame corresponds to "1", and thereafter is brought into the bypass condition. The succeeding station which is positioned at the lower stream side of the first station and under the condition of "DAC=0", performs operations similar to those of the above-described first station upon receipt of the DATS frame sent out from this first station. As previously described, when the transmission of the DAT frame is so controlled, the second station can receive the DAT frame of "AC=0" and can remain on the network, because the first station having the same address as that of the second station has been bypassed at a time instant where the second station sent out the DAT frame.

Furthermore, another method different from the above-described procedures may be considered. To a DAT frame, specific information for a source station, for instance, a physical position address of a station in question, or information of the adjoining stations may be contained. Based upon this specific information, it is possible to judge the priority rights of the stations by discriminating the DAT frame sent out from the self-station from the DAT frame sent out from the duplicated address stations.

The problem of the duplicated adddress may be solved by the following methods different from the above-described methods. That is, (a) each of stations within a network sends to all of the stations a specific frame, for instance, either AMP (Active Monitor Present) described in the above-described prior art, or SMP (Standby Monitor Present), and the station which has received this specific frame checks a source address (SA) thereof in order to recognize an occurrence of a duplicated address, and (b) a specific station for totally managing a network, e.g., a server is employed so as to solve the problem of the duplicated address.

It should be noted that in case of the former solving method, since starting and ending chances for the duplicated address test can be hardly grasped and therefore the duplicated address test is continuously performed, there is another problem of heavy loads. In the latter solving method, the above problem cannot be solved without employing such a server. Also since both of these solving methods detect the address failure after the respective stations in the network have been under the usual operation conditions, an adverse influence will be greatly given to the performance and reliability of the communication functions of the station in question (MAC upper stage user).

As apparent from the foregoing descriptions, in accordance with the present invention, it can be prevented the existence of the duplicated stations with the same address within the same ring. Furthermore, even when the number of the stations connected to the ring is varied, there is a particular advantage that the above-described duplicated address can be avoided under the configuration control of the ring reduction, or ring expansion.

One of basic ideas according to the present invention exists in such a point that the duplicated address test is performed every time a plurality of networks are coupled with each other, and does not depend upon topology of networks, i.e., configurations of rings, buses or meshes.

We claim:

1. A network system constructed of a plurality of stations each having a single address and connected via at least one transmission line to each other, said each of stations comprising:

first means for storing flag information indicating whether or not a duplicated address test is performed so as to detect whether or not other stations having the same address as that of a self-station already exist in said network;

second means for resetting the flag information stored in said first means at a predetermined timing;

third means for sending out a single signal frame for said duplicated address test to said transmission line in case that the flag information stored in said first means has been reset, said signal frame containing an address of a station which has transmitted said signal frame, and a field for discriminating whether or not the duplicated address is present; and, fourth means for writing information indicative of the existence of the duplicated address into said signal frame when a signal frame for the duplicated address test is received from another station, and if an address contained in said signal frame is coincident with the address of the self-station, and thereafter relaying said information to a succeeding station; for bypassing the self-station from said transmission line when the signal frame for the duplicated address test is received from the self-station and if information representative of the existence of the duplicated address is contained in said signal frame, and for writing flag information indicative of an end of said duplicated address test into said first means if not.

2. A network system as claimed in claim 1, wherein said each of stations further comprises:

means for causing said second means to reset said flag information in response to a change in said station from a rest condition to an active condition.

3. A network system as claimed in claim 1, wherein said each of stations further comprises:
means for causing said second means to reset said flag information when a specific control frame which has been transmitted from one of said plurality of stations is received.

4. A network including a first ring transmission line, a second ring transmission line having a signal transmission direction opposite to that of said first ring transmission line, and a plurality of stations connected to at least one of said first and second transmission lines, some of said stations constituting a plurality of control node means for performing a configuration control of said network, said each of stations comprising:
first means for storing flag information indicating whether or not a duplicated address test is performed so as to detect whether or not other stations having the same address as that of a self station already exist in said network;
second means for resetting said flag information to a condition indicating that an address test has not yet been performed;
third means for sending out a single signal frame for a duplicated address test to said first or second transmission lines to which said stations are connected in case that said flag information stored in said first means is reset, said signal frame containing an address of the station which has sent out said signal frame, and a field for discriminating whether or not the duplicated address is present; and,
fourth means for adding information indicative of the existence of the duplicated address to said received signal frame when a signal frame for the duplicated address test is received from another station, and if an address contained in said signal frame is coincident with the address of the self-station, and thereafter relaying said information to a succeeding station; for bypassing the self-station from said first or second transmission line when said signal frame sent out from the self-station is received and if the information representative of the existence of the duplicated address is contained in said signal frame, and for writing flag information representative of an end of said duplicated address test into said first means if not.

5. A network as claimed in claim 4, wherein said second means includes;
means for resetting said flag information when said station changes from a rest condition into an active condition.

6. A network as claimed in claim 4, wherein said second means includes:
means for resetting said flag information in response to a reception of a control frame for performing a configuration control of the network which has been sent out by anyone of other stations.

7. A network as claimed in claim 4, wherein said each of control node means includes switch means for establishing a signal loop back path either from said first transmission line to said second transmission line, or from said second transmission line to said first transmission lien, and for destroying a signal loop back path which has already been established;
at least one station contained in said each of control node means includes means for sending out a control frame for resetting said flag information of the outer station on the network to either said first or second transmission line while the configuration control of the network is performed by operating said switch means; and,
said second means resets the flag information which has been stored into said first means in response to the reception of the control frame.

8. A method for performing a duplicated address test used for a network containing a plurality of stations each having a single address, which are mutually connected by at least one ring-shaped transmission line, comprising:
a first step in which each of the stations which have moved from a rest condition to an active condition resets flag information indicating whether or not the duplicated address test is performed so as to detect whether or not the other station having the same address as that of a self-station exists on the network;
a second step in which each of the stations under such a condition that said flag information is reset, sends out a single signal frame for the duplicated address test to said transmission path when capturing a data transmission right to the transmission path, and also waits that said signal frame is circulated around said transmission line and returned thereto, said signal frame containing an address of a station which has transmitted said frame signal, and a field for discriminating whether or not the duplicated address exists;
a third step in which when the other station which is not under a waiting condition for said signal frame receives said signal frame, if an address of the received signal frame is coincident with an address of a self-station, said other station inserts information representative of the existence of the duplicated address into said received frame, and outputs the resultant frame to the transmission line; and,
a fourth step in which when the station which is under a waiting condition for said signal frame receives said signal frame, if the information indicative of the existence of the duplicated address is contained in the signal frame, said station bypasses the self-station from said transmission line, whereas said station changes said flag information into a condition representative of an end of the duplicated address test and is moved to a single operation mode in which a communication is allowed.

9. A method as claimed in claim 8, further comprising:
a step in which one of said plurality of stations sends out to said transmission line a control frame for resetting said flag information of all of other stations on the network; and,
a step in which each of the stations which have received said control frame resets flag information of said station.

10. A method for performing a duplicated address test for a network including a first ring transmission line, a second ring transmission line having a signal transmission direction opposite to that of said first ring transmission line, and a plurality of stations connected to at least one of said first and second transmission lines, each of said stations to which corresponding addresses have been allocated including means for storing flag information indicating whether or not the duplicated address test is performed, some of said plurality of stations constituting a plurality of control node means for performing a configuration control of said network, each of said control node means including switch means used for a configuration control operation of the network, for establishing a signal loop back path either from said first transmission line to said second transmission line, or from said second transmission line to said first transmission line, and for destroying a loop back path which has been already established;

said duplicated address test performing method comprising:

a first step in which any of said plurality of control node means sends out a single control frame to either said first or second transmission lines while the network configuration control operation is carried out;

a second step in which the other station which has received said control frame brings said flag information stored therein into a reset condition indicating that the duplicated address test has already been accomplished; and, a third step in which each of the stations in which said flag information has been under the reset condition performs the duplicated address test.

11. A method as claimed in claim 10, wherein in the duplicated address test of said third step, when each of the stations captures a data transmission right in said network, said each of the stations sends out a single signal frame for the duplicated address test to either said first or second transmission path to which said stations have been connected, said single signal frame including an address of the station to send out said signal frame, and information field for discriminating whether or not the duplicated address exists, and said discriminating information field contained in the received signal frame is checked when said frame has been circulated around the network and returned thereto, and said discriminating information field is changed into such a condition representative of the existence of the duplicated address when the other station having the same address as an address contained in said signal frame receives said signal frame.

* * * * *